United States Patent
Fink et al.

(10) Patent No.: US 12,304,621 B2
(45) Date of Patent: May 20, 2025

(54) ROTORCRAFT WITH A NON-RETRACTABLE WHEEL-TYPE LANDING GEAR

(71) Applicants: AIRBUS HELICOPTERS DEUTSCHLAND GMBH, Donauworth (DE); AIRBUS HELICOPTERS, Marignane (FR)

(72) Inventors: Axel Fink, Donauworth (DE); Aurelien Achard, Vitrolles (FR); Didier Bertin, Marseilles (FR)

(73) Assignees: AIRBUS HELICOPTERS DEUTSCHLAND GMBH, Donauworth (DE); AIRBUS HELICOPTERS, Marignane (FR)

( * ) Notice: Subject to any disclaimer, the term of this patent is extended or adjusted under 35 U.S.C. 154(b) by 134 days.

(21) Appl. No.: 18/233,637

(22) Filed: Aug. 14, 2023

(65) Prior Publication Data
US 2024/0182160 A1    Jun. 6, 2024

(30) Foreign Application Priority Data
Dec. 6, 2022 (EP) .................................. 22315306

(51) Int. Cl.
*B64C 25/36* (2006.01)
*B64C 25/32* (2006.01)
*B64C 25/58* (2006.01)

(52) U.S. Cl.
CPC .............. *B64C 25/36* (2013.01); *B64C 25/58* (2013.01); *B64C 2025/325* (2013.01)

(58) Field of Classification Search
CPC .... B64C 25/36; B64C 25/38; B64C 2025/325
See application file for complete search history.

(56) References Cited

U.S. PATENT DOCUMENTS

| | | |
|---|---|---|
| 2,843,345 A | 7/1958 | Sikorsky |
| 3,128,971 A | 4/1964 | Daffer |

(Continued)

FOREIGN PATENT DOCUMENTS

| | | | |
|---|---|---|---|
| CN | 211494436 U | | 9/2020 |
| CN | 113911322 A | * | 1/2022 |
| EP | 3112254 A1 | | 1/2017 |

OTHER PUBLICATIONS

Machine Translation of CN-113911322-A1, Tian Z, Jan. 11, 2022 (Year: 2022).*

(Continued)

*Primary Examiner* — Tien Q Dinh
*Assistant Examiner* — Katherine June Walter
(74) *Attorney, Agent, or Firm* — BROOKS KUSHMAN P.C.

(57) ABSTRACT

A rotorcraft with at least one non-retractable wheel-type landing gear and a fuselage comprising a lower shell, an inner floor, and at least one lower fuselage compartment arranged between the inner floor and the lower shell, wherein the at least one non-retractable wheel-type landing gear is rigidly attached in the at least one lower fuselage compartment and comprises: at least one wheel; a shock absorber connected to the at least one wheel and comprising a shock absorber tube and a shock absorber rod telescopically mounted to the shock absorber tube; at least two mounting arms extending laterally from the shock absorber tube; and a mounting pin extending from the shock absorber tube toward a floor fitting provided at the inner floor, wherein the mounting pin is connected to the floor fitting.

15 Claims, 5 Drawing Sheets

(56) References Cited

U.S. PATENT DOCUMENTS

| | | | |
|---|---|---|---|
| 3,547,425 A | 12/1970 | Wachenheim | |
| 3,954,232 A | 5/1976 | Harper | |
| 4,345,727 A * | 8/1982 | Brown | B64C 25/12 |
| | | | 244/102 R |
| 5,060,886 A | 10/1991 | Davis et al. | |
| 2005/0279882 A1 * | 12/2005 | Muylaert | B64C 1/062 |
| | | | 244/100 R |
| 2006/0237584 A1 * | 10/2006 | Hinton | B64C 25/10 |
| | | | 244/102 R |
| 2011/0260000 A1 * | 10/2011 | Mairou | B64C 25/00 |
| | | | 244/102 R |

OTHER PUBLICATIONS

The design of the Mi-8MTV helicopter; St. Petersburg University of Civil Aviation; Apr. 21, 2018). XP093040989.

FAA-Handbook "3-1 landing Gear Types"; pp. 1-96; Oct. 31, 2013. XP055336068.

European Search Report for European Application No. EP 22315306. 5, Completed by the European Patent Office, Dated Apr. 26, 2023, 7 pages.

* cited by examiner

ROTORCRAFT WITH A NON-RETRACTABLE WHEEL-TYPE LANDING GEAR

CROSS-REFERENCE TO RELATED APPLICATIONS

This application claims priority to European patent application No. EP 22315306.5 filed on Dec. 6, 2022, the disclosure of which is incorporated in its entirety by reference herein.

TECHNICAL FIELD

The disclosure is related to a rotorcraft with a fuselage that forms at least one lower fuselage compartment, and with at least one non-retractable wheel-type landing gear rigidly attached in the at least one lower fuselage compartment and extending at least partly through an opening formed in a lower shell of the rotorcraft.

BACKGROUND

In general, rotorcrafts are either provided with retractable or partially retractable landing gears, or with fixed, i.e., non-retractable landing gears. Retractable or partially retractable landing gears are usually embodied as wheel-type landing gears, while fixed, i.e., non-retractable landing gears are usually embodied as both skid-type landing gears or wheel-type landing gears.

Use of either a wheel-type landing gear or a skid-type landing gear for a given rotorcraft mostly depends on a respective size and weight of the given rotorcraft. More particularly, wheel-type landing gears are usually implemented with larger, i.e., medium-to-heavy rotorcrafts in order to allow for an improved ground handling of such larger rotorcrafts, while smaller, i.e., light-to-medium rotorcrafts are usually implemented with skid-type landing gears.

More specifically, a wheel-type landing gear of a conventional rotorcraft may either have a so-called tricycle-type layout or, less frequently, a so-called quadricycle-type layout. The tricycle-type layout is intended to enable resting of a given rotorcraft on three separate landing gears and refers to a configuration with either a single nose-wheel landing gear or a single tail-wheel landing gear. The single nose-wheel landing gear configuration, which is currently most used, features a single landing gear provided in a nose fuselage section of a given rotorcraft and two main landing gears provided in a rear fuselage section of the given rotorcraft. The single tail-wheel landing gear, instead, features a single landing gear provided in a tail section of a given rotorcraft and two main landing gears provided in a front section of the given rotorcraft.

If a given wheel-type landing gear is retractable or partially retractable, its nose/tail and main landing gears are totally or partially housed in forward flight operation of a given rotorcraft within associated landing gear compartments in order to substantially reduce a respective aerodynamic drag of the given rotorcraft, hence, enabling an increased flight speed while reducing fuel consumption and allowing for larger flight ranges. However, in contrast to fixed-wing applications the associated landing gear compartments of the given rotorcraft are usually not closed by trap doors in the forward flight operation, since an improvement of the respective aerodynamic drag that would be associated with closed trap doors does not prevail over an additional weight of such trap doors and their associated kinematics.

Nevertheless, case a respectively required retraction capability of the given wheel-type landing gear already results in an increase of design complexity of the given wheel-type landing gear and its kinematics and requires a comparatively large fuselage storage volume, hence, reducing available usable volume in the fuselage. Furthermore, a respective need for actuation, which is usually either electric or hydraulic, with its control and harnesses associated to retraction/expansion result in a weight increase of the given wheel-type landing gear and must be evaluated carefully against obtainable aerodynamic advantages.

However, as a general rule retractable or partially retractable wheel-type landing gears are deemed advantageous in terms of overall operational performance for fast rotorcrafts. Illustrative retractable or partially retractable wheel-type landing gears are described in the documents EP 3 112 254 A1 and U.S. Pat. No. 3,954,232 A.

Nevertheless, the simplicity and robustness, the compactness as well as the reduced weight of fixed, i.e., non-retractable wheel-type landing gears may lead to improved singular operational performances with larger useful volumes, larger payloads and less need for maintenance. Illustrative non-retractable wheel-type landing gears are described in the documents U.S. Pat. Nos. 2,843,345, 3,128,971, 3,547,425, and 5,060,886.

More specifically, an important requirement for fixed, i.e., non-retractable wheel-type landing gears is linked to an underlying attachment design which should be developed in a way to avoid the non-retractable wheel-type landing gear of being subjected to a respective overall elastic behavior of a given rotorcraft. This is especially the case with nose landing gears and main landing gears of non-retractable wheel-type landing gears, which are housed within an internal perimeter of the rotorcraft's fuselage. Such nose landing gears conventionally comprise a shock absorber connected to associated wheels, the shock absorber including a static shock absorber tube and a slidable shock absorber cylinder or rod which is telescopically mounted to the shock absorber tube. The shock absorber tube incorporates all required fixations and the shock absorber rod is connected to the associated wheels and travels inside the shock absorber tube during stroking. The shock absorber rod and the shock absorber tube are furthermore interconnected by a torque link which blocks relative axial rotation of both whilst providing for kinematic freedom for stroking.

Usually, an overall isostatic fixation of nose landing gears is provided, which avoids in a respective isostatic condition involvement of the rotorcraft's fuselage within the elastic deformation of a given nose landing gear and allows for an easy tolerancing management. In addition, respective attachments designs should be developed in a way to reduce as much as possible respective interface loads by ensuring adequate basis for moment reactions and to ensure a good accessibility to respective fixation parts for inspection and disassembly in a repair scenario.

A conventional attachment design for a nose landing gear of a rotorcraft usually involves the so-called tripod principle with two main fixation points on the nose landing gear's shock absorber and a third fixation point which is arranged at a predetermined distance away from the two main fixation points. The two main fixation points define a trunnion axis about which the nose landing gear would be able to rotate. Any rotation is, however, blocked by the third fixation point. This third fixation point is usually performed by means of a fixed, rigid rod providing for longitudinal support of the shock absorber. The rod is either installed below or above the main fixation points of the shock absorber and is either straight or inclined, usually attaching a structural floor and a structural frame of the rotorcraft via a specific bracket. The use of spherical bearings on the main fixation points and respective axial ends of the rod enables an overall isostatic fixation of the nose landing gear. The documents CN211494436, XP093040989 ("The design of the Mi-8MTV helicopter"; St. Petersburg University of Civil Aviation; 2018 Apr. 21) and XP055336068 (FAA-HAND-BOOK "3-1 landing Gear Types"; pages 1-96; 2013 Oct. 31) were cited.

SUMMARY

It is an object of the present disclosure to provide a new rotorcraft with a fixed, i.e., non-retractable wheel-type landing gear and, more particularly, with a nose landing gear that provides for an improved weight efficiency and a decreased required installation volume, as well as improved reaction load paths into an associated fuselage of the new rotorcraft and simplified exchangeable attachment fittings which allow a comparatively good accessibility to respective fixations.

This object is solved by a rotorcraft with at least one non-retractable wheel-type landing gear. More specifically, the rotorcraft comprises a fuselage with a lower shell, an inner floor, and at least one lower fuselage compartment arranged between the inner floor and the lower shell, wherein the at least one lower fuselage compartment is equipped with a floor fitting provided at the inner floor and at least two lateral fittings. The at least one lower fuselage compartment is at least accessible via an opening formed in the lower shell and at least one non-retractable wheel-type landing gear is rigidly attached in the at least one lower fuselage compartment and extends at least partly through the opening formed in the lower shell. The at least one non-retractable wheel-type landing gear comprises at least one wheel and a shock absorber connected to the at least one wheel. The shock absorber comprises a shock absorber tube and a shock absorber rod telescopically mounted to the shock absorber tube. The at least one wheel-type landing gear further comprises at least two mounting arms extending laterally from the shock absorber tube toward the at least two lateral fittings in the at least one lower fuselage compartment, wherein the at least two mounting arms are mounted to the at least two lateral fittings, and a mounting pin extending from the shock absorber tube toward the floor fitting provided at the inner floor, wherein the mounting pin is connected to the floor fitting.

Advantageously, the rotorcraft according to the present disclosure comprises at least one non-retractable wheel-type landing gear with an improved design and attachment principle which is particularly, but not exclusively, suitable for application to a nose landing gear. The at least one non-retractable wheel-type landing gear outstands by its overall simplicity and light weight characteristics in comparison to conventional designs. In particular, no strut and its associated fittings are required for fixation of the at least one non-retractable wheel-type landing gear.

More particularly, the improved design and attachment principle is based on provision of two main attachment points in a lower region of a shock absorber tube of the at least one non-retractable wheel-type landing gear, and a third attachment point in an upper region of the shock absorber tube. The two main attachment points are realized by at least two mounting arms extending laterally from the shock absorber tube, which are preferably connected to longerons of the rotorcraft's fuselage, i.e., airframe, which are principal structural elements of the airframe and essentially extend in a longitudinal direction of the rotorcraft. Thereby, the two mounting arms define a trunnion axis. A possible rotation of the at least one non-retractable wheel-type landing gear about this trunnion axis is, however, blocked by the third attachment point, which is preferably directly arranged at floor level of the rotorcraft without any additional rod. The third attachment point is realized by the mounting pin extending from the shock absorber tube toward the floor fitting provided at the inner floor.

Furthermore, a lower side of the shock absorber tube may be provided with a locking pad which is intended to block lateral, i.e., transversal shock motion of the absorber, hence, transferring lateral loads directly into a front frame or bulkhead and avoiding a disadvantageous and challenging transverse loading of main fittings provided at the two main attachment points. The locking pad is preferably caught by a corresponding fuselage or airframe fitting and blocks lateral motions, but keeps vertical motions free.

The mounting pin is incorporated into the at least one non-retractable wheel-type landing gear and extends preferably vertically from the shock absorber tube, i.e., the shock absorber, and perpendicular to a respective floor plane formed by an inner floor of the rotorcraft. Since the mounting pin as upper support of the shock absorber is arranged on the top end of the shock absorber tube, there is a maximization of the vertical basis, i.e., the distance between the trunnion axis and the upper fixation unit, and consequently a reduction of interface loads which further reduces a respectively required weight of the upper fixation unit.

The mounting pin may either be an integral part of the shock absorber tube, especially if the shock absorber tube is made of steel, or it may a separate component conveniently attached to the shock absorber tube by being inserted into an integral mounting lug extending e.g., radially from the shock absorber tube. A respective mounting pin length axis may thereby either be coaxial or congruent with a respective shock absorber tube length axis, or instead be offset therefrom, which is deemed particularly advantageous if a separate, non-integral mounting pin is used. However, in the latter case there is no specific need to arrange the mounting pin length axis and the shock absorber tube length axis in parallel, although it is considered advantageous.

The mounting pin is inserted at the floor plane into an upper fixation unit which is housed within the inner floor of the rotorcraft. Hence, the mounting pin holds the shock absorber tube and, thus, the shock absorber in place at the upper end of the shock absorber tube at the upper fixation unit. Integration of the upper fixation unit into the inner floor is advantageously compact and does not obstacle a respective inner volume of the rotorcraft's subfloor in contrast to conventional designs which require struts and other support elements, such as crossbeams, bulkheads, frames etc. Hence, a respectively available useful volume is maximized, allowing integration and easy access of equipment arranged in it.

More specifically, the upper fixation unit is preferably inserted into a corresponding opening provided in the inner floor of the rotorcraft, which is conveniently designed to react the mounting pin longitudinal load. The vertical position of the upper fixation unit is preferably fixed by a set of screws, advantageously being inserted and torqued from below. Hence, the upper fixation unit is entirely removable from the inner floor.

More particularly, the corresponding opening preferably comprises an adequate clearance fit allowing for an easy insertion and extraction of the upper fixation unit, as well as a proper load reaction capability from the upper fixation unit into the inner floor. Due to a preferably relatively large diameter of the contact surface between inner floor and the upper fixation unit, respective bearing contact loads are low. The fixation of the upper fixation unit to the inner floor is just accomplished by screws, which have no load bearing function. As a result, the upper fixation unit can be easily extracted for inspection, repair or exchange, even interchange.

Moreover, the upper support of the at least one non-retractable wheel-type landing gear which is formed by the upper fixation unit is directly arranged in the inner floor, i.e., in the structural floor of the rotorcraft without being first transmitted by a strut. Thus, the reaction load at the upper fixation unit is in-plane with respect to the inner floor, which eliminates parasitic loads and an associated need of additional parts to react those parasitic loads. In fact, use of an inclined strut for conventional concepts requires the support of a vertical load and, hence, the additional support of a vertically stiff structural element, such as a crossbeam, a frame, or a bulkhead, which may advantageously be omitted in the at least one non-retractable wheel-type landing gear of the rotorcraft according to the present disclosure.

The upper fixation unit is preferably rigid in longitudinal direction of the rotorcraft's fuselage, but provides for freedom of movement in transverse and vertical direction, meaning that the mounting pin is not able to move longitudinally but transversally and vertically at the upper fixation unit. In addition, rotations of the mounting pin at the upper fixation unit are preferably enabled, so that the mounting pin is able to rotate about all axes, i.e., vertically, longitudinally, and transversely. This is necessary to achieve a required isostatic condition of the overall landing gear fixation.

More specifically, required kinematic degrees of freedom and constraints of the mounting pin are achieved by a specific design of the upper fixation unit. The upper fixation unit is inserted and fixed into the inner floor but includes some specific elements which ensure that the mounting pin is kinematically constrained in terms of longitudinal motion only. More specifically, the upper fixation unit is preferably basically composed of a spherical bearing, a sliding block, and a socket. The mounting pin is inserted into the spherical bearing, thus, providing for freedom of rotations, and it is able to slide in it, thus, providing for vertical freedom of motion. The spherical bearing, in turn, is inserted into the sliding block with a specific outer shape which is housed within an associated accommodation provided by the socket. The shape of the sliding block and the associated accommodation of the socket are preferably designed so as to have contact in the longitudinal direction but to have play in the transversal direction, meaning that the sliding block is able to slide laterally with respect to the socket, thus, providing for lateral freedom of motion of the mounting pin. This is advantageously achieved by a rectangular shape of both the external face of the sliding block and the internal face of the associated accommodation of the socket, whereas the lateral width of the associated accommodation is larger than the lateral width of the sliding block, and the longitudinal width of both is equal.

In addition, respective sliding and contact faces of the sliding block, socket and inner floor are conveniently adapted for an optimal tribology behavior by coating or adding intermediate bushings. Suitable coatings and intermediate bushings are well-known to the person skilled in the art and, therefore, not described in more detail.

In an illustrative integration procedure for integrating the at least one non-retractable wheel-type landing gear into the rotorcraft, the shock absorber is initially guided upwards in the at least one lower fuselage compartment and the mounting pin is inserted into the spherical bearing of the upper fixation unit attached to the rotorcraft's inner floor. Then, lateral pins are inserted and attached at the at least two lateral fittings on the at least two mounting arms. Thus, no assembly procedure, such as torque wrenching, is required within the at least one lower fuselage compartment, just within the lower perimeter of the shock absorber tube which is easily accessible from below the rotorcraft. For a simplified and comfortable insertion of the mounting pin into the spherical bearing, the mounting pin is preferably shaped with a chamfered or rounded head provided for self-guidance. A mounting pin which has a length axis offset from the shock absorber tube length axis advantageously further improves a required visibility during the integration procedure.

According to some preferred embodiments, the rotorcraft further comprises a fixation unit mounted to the floor fitting, wherein the mounting pin is mounted to the fixation unit.

The mounting pin may be mounted with a predetermined play in transverse direction of the fuselage to the fixation unit.

Alternatively, or in addition, the mounting pin may be mounted free of play in longitudinal direction of the fuselage to the fixation unit.

The fixation unit may comprise a socket that is rigidly attached to the inner floor, preferably by means of screws.

Furthermore, the fixation unit may comprise a spherical bearing mounted to the mounting pin.

The mounting pin comprises an associated length axis and may be slidable within the spherical bearing in direction of the associated length axis.

Moreover, the fixation unit may comprise a sliding block housing the spherical bearing.

The sliding block may be mounted to the socket with a predetermined play in transverse direction of the fuselage and/or free of play in longitudinal direction of the fuselage.

Furthermore, the fixation unit may comprise a cover that covers the fixation unit on a side pointing away from the shock absorber.

According to some preferred embodiments, a seal may be arranged between the floor fitting and an axial end of the shock absorber tube.

According to some preferred embodiments, the mounting pin is integrally formed with the shock absorber tube.

Alternatively, the shock absorber tube may comprise a mounting lug, wherein the mounting pin is rigidly mounted to the mounting lug.

The shock absorber tube comprises a first length axis and the mounting pin comprises a second length axis. The first and second length axes may be congruent. Alternatively, the first and second length axes may be arranged in parallel.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
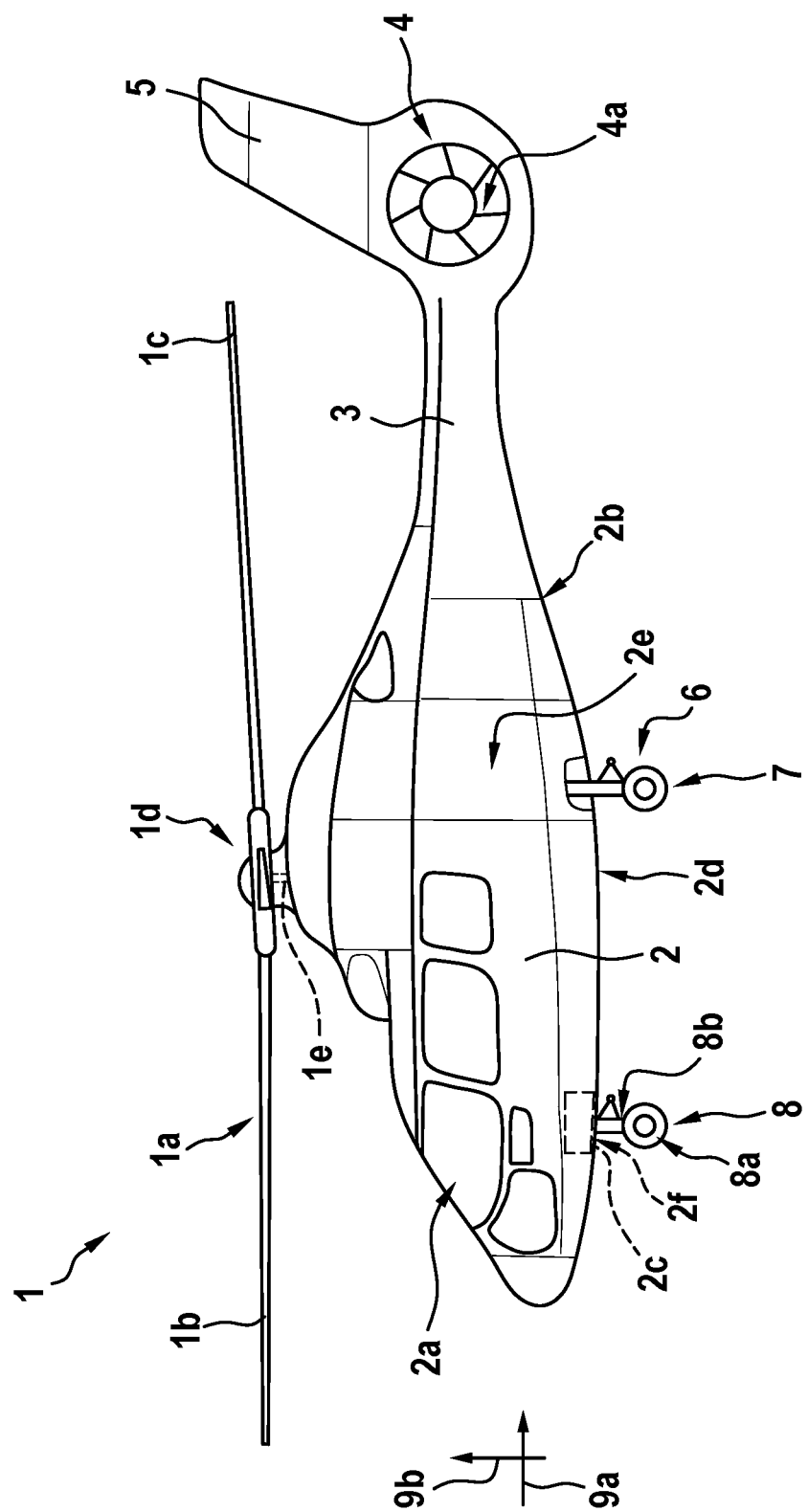
FIG. 1 shows a lateral view of a rotorcraft with at least one non-retractable wheel-type landing gear.

FIG. 1 shows a rotorcraft 1 that is exemplarily illustrated as a helicopter. Thus, for purposes of simplicity and clarity, the rotorcraft 1 is hereinafter referred to as the "helicopter 1".

Illustratively, the helicopter 1 comprises at least one main rotor 1a for providing lift and forward or backward thrust during operation. By way of example, the at least one main rotor 1a is embodied as a multi-blade main rotor that comprises a plurality of rotor blades 1b, 1c which are mounted at an associated rotor head 1d to a rotor shaft 1e, which rotates in operation of the helicopter 1 around an associated rotor axis.

The helicopter 1 further comprises a fuselage 2 on top of which the at least one main rotor 1a is located. Illustratively, the fuselage 2 forms a cabin 2a and a rear fuselage 2b and extends in a longitudinal direction 9a, a vertical direction 9b, and a transverse direction (9c e.g., in FIG. 2). The fuselage 2 is connected at the rear fuselage 2b to a tail boom 3. By way of example, the helicopter 1 further comprises at least one preferentially shrouded counter-torque device 4 which is located on the tail boom 3 and configured to provide counter-torque during operation, i.e., to counter the torque created by rotation of the at least one main rotor 1a for purposes of balancing the helicopter 1 in terms of yaw. The at least one counter-torque device 4 is illustratively provided at an aft section of the tail boom 3 and preferably comprises a tail rotor 4a. The aft section of the tail boom 3 preferably further comprises a fin 5.

More specifically, the fuselage 2 comprises at least a lower shell 2d, an inner floor (14 e.g., in FIG. 2), and at least one lower fuselage compartment 2c arranged between the inner floor and the lower shell 2d. The at least one lower fuselage compartment 2c is equipped with a floor fitting (14d e.g., in FIG. 4) provided at the inner floor and at least two lateral fittings (15 e.g., in FIG. 2). The lower shell 2d is connected to a side shell 2e and encases together with the latter the inner floor. Furthermore, the lower shell 2d forms an opening 2f through which the at least one lower fuselage compartment 2c is accessible.

Illustratively, the fuselage 2 is connected to a wheel-type landing gear 6 that comprises at least one fixed, i.e., non-retractable wheel-type landing gear 8 rigidly attached in the at least one lower fuselage compartment 2c and extending at least partly through the opening 2f formed in the lower shell 2d. The at least one fixed, i.e., non-retractable wheel-type landing gear 8 comprises at least one wheel 8a, illustratively so-called tandem wheels, and a shock absorber 8b connected to the tandem wheels 8a.

By way of example, the wheel-type landing gear 6 has a tricycle-type layout in which the at least one non-retractable wheel-type landing gear 8 implements a single nose landing gear. Thus, the at least one non-retractable wheel-type landing gear 8 is also referred to as hereinafter as "the nose landing gear 8", for simplicity and brevity. Illustratively, the wheel-type landing gear 6 with the tricycle-type layout further comprises two fixed, i.e., non-retractable main landing gears 7.

Figure 2:
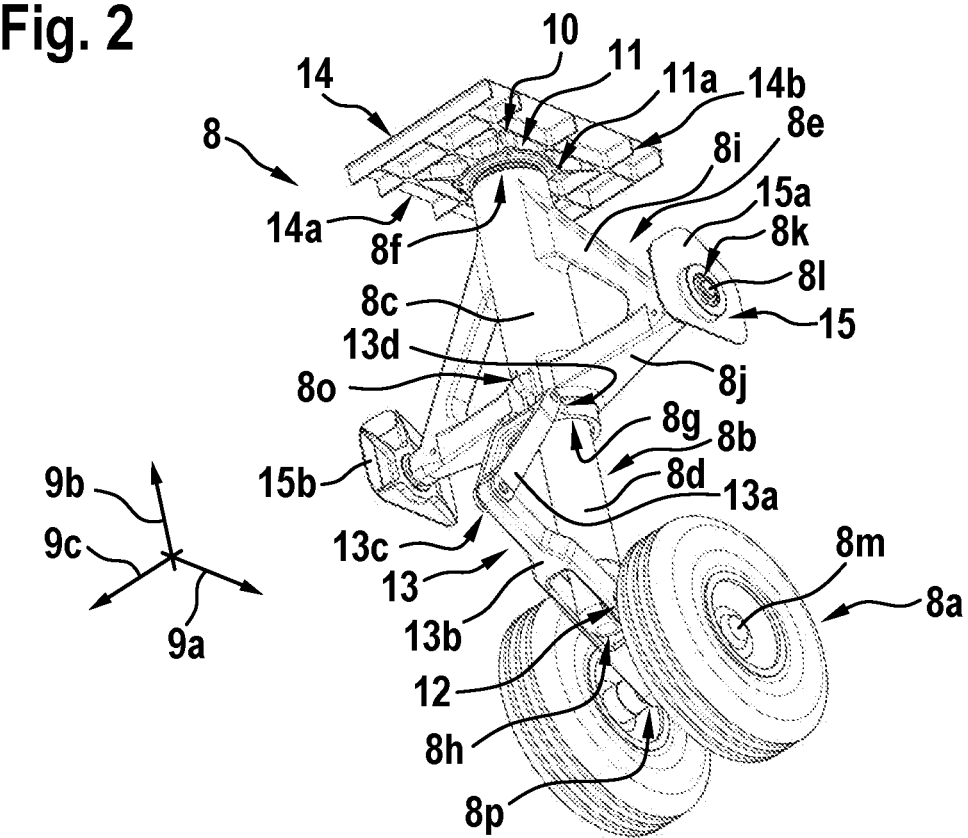
FIG. 2 shows a perspective view of the at least one non-retractable wheel-type landing gear of FIG. 1, with a shock absorber connected to an inner floor of the rotorcraft of FIG. 1.

FIG. 2 shows the nose landing gear 8 of FIG. 1 with the tandem wheels 8a and the shock absorber 8b, as well as a portion of an inner floor 14 of the fuselage 2 of FIG. 1 to which the shock absorber 8b is mounted. The inner floor 14 is illustrated from a lower side 14a with an associated stiffening structure 14b. The stiffening structure 14b is provided for reacting loads transferred into the inner floor 14. Furthermore, the longitudinal direction 9a, the vertical direction 9b, as well as a transverse direction 9c of the fuselage 2 of FIG. 1 are indicated and applied in analogy to the nose landing gear 8.

As described above at FIG. 1, the shock absorber 8b is connected to the tandem wheels 8a. Furthermore, the shock absorber 8b comprises a shock absorber tube 8c and a shock absorber rod 8d telescopically mounted to the shock absorber tube 8c. Illustratively, the shock absorber tube 8c comprises an upper end 8f and an axially opposed lower end 8g. The lower end 8g is an open end via which the shock absorber rod 8d is introduced into the shock absorber tube 8c. The shock absorber rod 8d may also be referred to as a shock absorber cylinder.

Illustratively, the shock absorber tube 8c is mounted in the region of its upper end 8f to the inner floor 14 at an associated tube fixation 10, as described in more detail below at FIG. 3 to FIG. 6. The tube fixation 10 comprises a fixation unit 11 that is mounted to the inner floor 14. More specifically, the fixation unit 11 is rigidly attached to the inner floor 14 at the lower side 14a, preferably by means of screws 11a.

At least two and, by way of example, exactly two mounting arms 8e extend laterally from the shock absorber tube 8c in the transverse direction 9c toward at least two and, by way of example, exactly two lateral fittings 15 provided in the at least one lower fuselage compartment 2c of FIG. 1. The two mounting arms 8e are mounted to the two lateral fittings 15. More specifically, a first one of the two mounting arms 8e is mounted to a first lateral fitting 15a, and a second one of the two mounting arms 8e is mounted to a second lateral fitting 15b. Preferably, each one of the lateral fittings 15a, 15b is separately mounted, e.g., structurally riveted, to an associated longeron of the fuselage 2 of FIG. 1.

Illustratively, a locking pad 80 is arranged on the shock absorber tube 8c between the two mounting arms 8e. The locking pad 80 may be provided for blocking lateral motion of the shock absorber 8b, i.e., motion of the shock absorber 8b in the transverse direction 9c, hence, transferring lateral loads directly into a front frame or bulkhead and avoiding a disadvantageous and challenging transverse loading of the two main fittings 15a, 15b.

Preferably, the two mounting arms 8e are identical, at least within predetermined manufacturing tolerances, and symmetrically arranged on diametrically opposed sides of the shock absorber 8b, i.e., the shock absorber tube 8c. Accordingly, only components of a single one of the two mounting arms 8e are provided with associated reference signs and representatively described in more detail below, for simplicity and brevity.

Illustratively, the mounting arm 8e comprises an upper mounting arm section 8i and a lower mounting arm section 8j. By way of example, the lower mounting arm section 8j extends in the transverse direction i.e., at 9c, least approximately perpendicularly away from the shock absorber tube 8c and is connected to the latter in the region of the lower end 8g. The upper mounting arm section 8i, in turn, is connected to the shock absorber tube 8c in the region of the upper end 8f and is kinked relative to the shock absorber tube 8c such that the upper mounting arm section 8i and the lower mounting arm section 8j intersect, thereby forming a triangular structure with the shock absorber tube 8c. In this triangular structure, preferably a trunnion 8l is provided at the intersection of the upper mounting arm section 8i and the lower mounting arm section 8j for provision of a trunnion fixation 8k at the lateral fitting 15a.

The shock absorber tube 8c is preferably also linked via a torque link 13 to the shock absorber rod 8d. Illustratively, the torque link 13 comprises a torque arm 13a pivotally mounted to a fixation 13d provided on the shock absorber tube 8c close to the lower end 8g of the shock absorber tube 8c. The torque link 13 further comprises a mounting bracket 13b pivotally mounted to the torque arm 13a at an associated hinged connection 13c. The mounting bracket 13b is further pivotally mounted to the shock absorber rod 8d via a mounting bracket hinge 12 arranged in the region of a lower end 8h of the shock absorber rod 8d. Furthermore, the mounting bracket 13b is provided with a wheel axle bearing 8p that rotatably receives a wheel axle 8m of the tandem wheels 8a.

Figure 3:
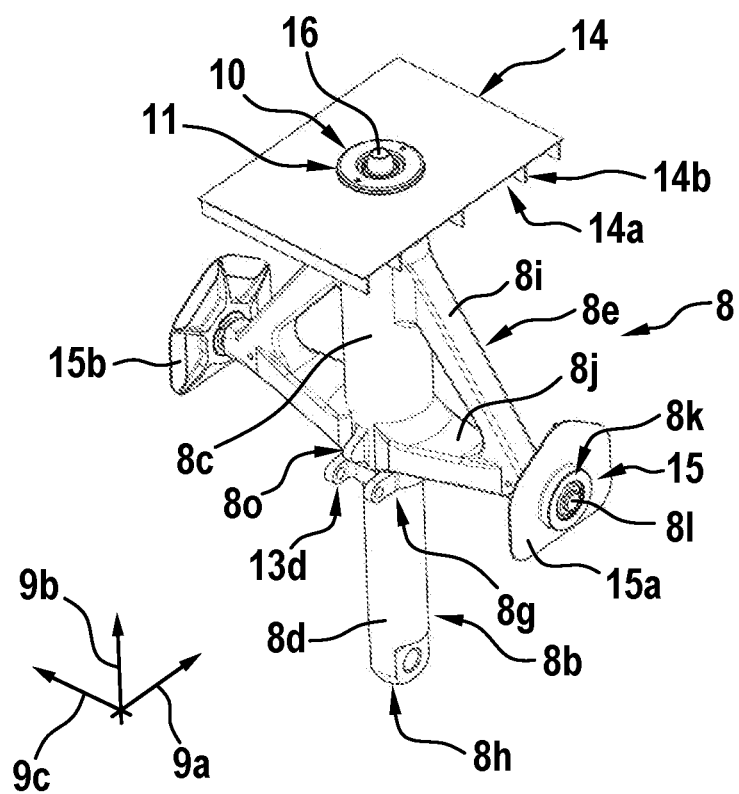
FIG. 3 shows a perspective view of a portion of the at least one non-retractable wheel-type landing gear of FIG. 2.

FIG. 3 shows the nose landing gear 8 with the shock absorber 8b of FIG. 2 together with the inner floor 14 of FIG. 2, where the shock absorber 8b is mounted to the tube fixation 10 which comprises the fixation unit 11 that is mounted to the inner floor 14. Similar to FIG. 2, the longitudinal direction 9a, the vertical direction 9b, as well as the transverse direction 9c are indicated. However, illustration of the tandem wheels 8a and the torque link 13 of FIG. 2 is omitted, for simplicity and clarity of the drawing.

As described above at FIG. 2, the shock absorber 8b comprises the shock absorber tube 8c and the shock absorber rod 8d telescopically mounted to the shock absorber tube 8c. The two mounting arms 8e extend laterally from the shock absorber tube 8c in the transverse direction 9c and are mounted to the two lateral fittings 15a, 15b.

Furthermore, the shock absorber 8b and, more specifically, the shock absorber tube 8c is connected via a mounting pin 16 to the inner floor 14. Preferably, the mounting pin 16 is mounted to the fixation unit 11 with a predetermined play in the transverse direction 9c and/or free of play in the longitudinal direction 9a. More specifically, the mounting pin 16 extends from the shock absorber tube 8c in the vertical direction 9b toward the tube fixation 10 and is connected to the fixation unit 11 as described in more detail below at FIG. 4 to FIG. 6.

Figure 4:
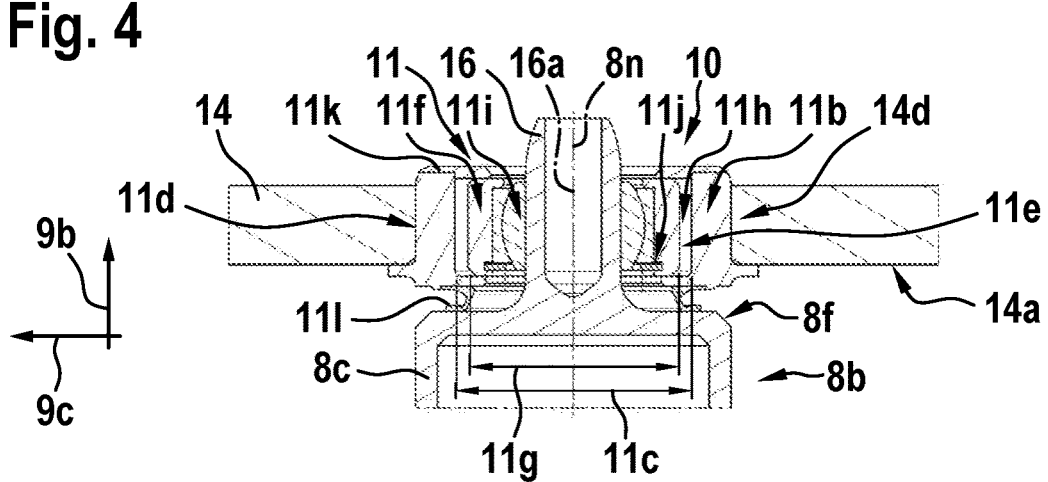
FIG. 4 shows a sectional view of a portion of the at least one non-retractable wheel-type landing gear of FIG. 2, seen in longitudinal direction of the rotorcraft of FIG. 1.

FIG. 4 shows the upper end 8f of the shock absorber 8b of FIG. 2 and FIG. 3 together with the inner floor 14 of FIG. 2 and FIG. 3, where the shock absorber 8b is mounted to the tube fixation 10 which comprises the fixation unit 11 that is mounted to the inner floor 14. Similar to FIG. 2 and FIG. 3, the vertical direction 9b and the transverse direction 9c are indicated.

According to FIG. 3, the shock absorber 8b is connected to the fixation unit 11 at the inner floor 14 via the mounting pin 16 that extends illustratively from the shock absorber tube 8c in the vertical direction 9b toward the tube fixation 10. Illustratively, the tube fixation 10 comprises a floor fitting 14d provided at the inner floor 14. A seal 11l may be arranged between the floor fitting 14d and the upper end 8f of the shock absorber tube 8c in order to prevent dirt penetration into the fixation unit 11.

The fixation unit 11 may comprise a top cover 11k that covers the fixation unit 11 on a side pointing away from the shock absorber 8b. The fixation unit 11 is preferably mounted to the floor fitting 14d and the mounting pin 16 is mounted to the fixation unit 11. Therefore, the mounting pin 16 extends from the shock absorber tube 8c in the vertical direction 9b, illustratively in direction of a length axis 8n of the shock absorber 8b, i.e., the shock absorber tube 9c, toward the floor fitting 14d provided at the inner floor 14.

More specifically, the fixation unit 11 may comprise a socket 11b that is rigidly attached to the inner floor 14, preferably by means of the screws 11a of FIG. 2. The socket 11b may comprise an outer bearing surface 11d that fits to the floor fitting 14d.

The fixation unit 11 may comprise a spherical bearing 11i mounted to the mounting pin 16. The mounting pin 16 has an associated length axis 16a and is preferably slidable within the spherical bearing 11i in direction of the associated length axis 16a, and rotatable by means of the spherical bearing 11i.

Furthermore, the fixation unit 11 may comprise a sliding block 11f housing the spherical bearing 11i. The spherical bearing 11i may be secured in the sliding block 11f using a securing ring 11j.

The sliding block 11f is preferably mounted to the socket 11b with a predetermined play 11h in the transverse direction 9c. Therefore, the socket 11b forms an accommodation 11e for the sliding block 11f, which has a width 11c in the transverse direction 9c that is greater than a corresponding width 11g of the sliding block 11f in the transverse direction 9c. Accordingly, a gap is formed in the transverse direction 9c between the sliding block 11f and the socket 11b, which determines the predetermined play 11h of the sliding block 11f and, thus, the mounting pin 16 in the transverse direction 9c.

The mounting pin 16 is preferably integrally formed with the shock absorber tube 8c. The length axis 16a of the mounting pin 16 and the length axis 8n of the shock absorber tube 8c may be congruent. Alternatively, the length axis 16a of the mounting pin 16 and the length axis 8n of the shock absorber tube 8c may be arranged in parallel.

Figure 5:
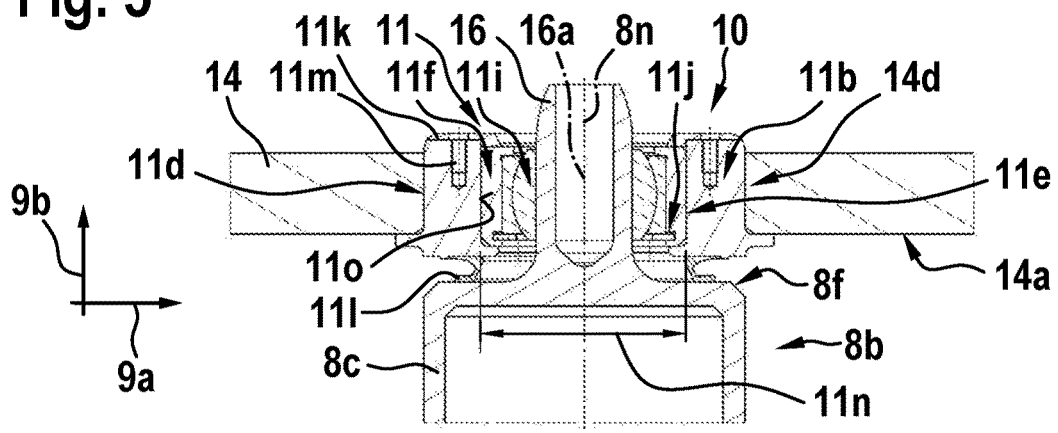
FIG. 5 shows a sectional view of a portion of the at least one non-retractable wheel-type landing gear of FIG. 2, seen in transverse direction of the rotorcraft of FIG. 1.

FIG. 5 shows the upper end 8f of the shock absorber 8b of FIG. 4, with the mounting pin 16 that extends from the shock absorber tube 8c of the shock absorber 8b in the vertical direction 9b toward the tube fixation 10, where the mounting pin 16 is rotatably mounted to the fixation unit 11 at the inner floor 14. Similar to FIG. 2 and FIG. 3, the longitudinal direction 9a and the vertical direction 9b are indicated.

As described above at FIG. 4, the fixation unit 11 is covered by the top cover 11k and mounted to the floor fitting 14d provided at the inner floor 14. The fixation unit 11 comprises the socket 11b with the outer bearing surface 11d that fits to the floor fitting 14d. Furthermore, the spherical bearing 11i that is mounted to the mounting pin 16 is housed in the sliding block 11f mounted to the socket 11b that forms an accommodation 11e for the sliding block 11f.

Illustratively, the accommodation 11e has a length in the longitudinal direction 9a that corresponds to a respective length of the sliding block 11f in the longitudinal direction 9a. Both lengths are commonly labeled with the reference sign 11n. Accordingly, the sliding block 11f is mounted to the socket 11b free of play in the longitudinal direction 9a.

FIG. 5 further illustrates a sliding contact surface 110 formed between the sliding block 11f and the socket 11b. In addition, FIG. 5 also further illustrates fixation screws 11m used for attaching the top cover 11k to the fixation unit 11 and, more particularly, to the socket 11b.

Figure 6:
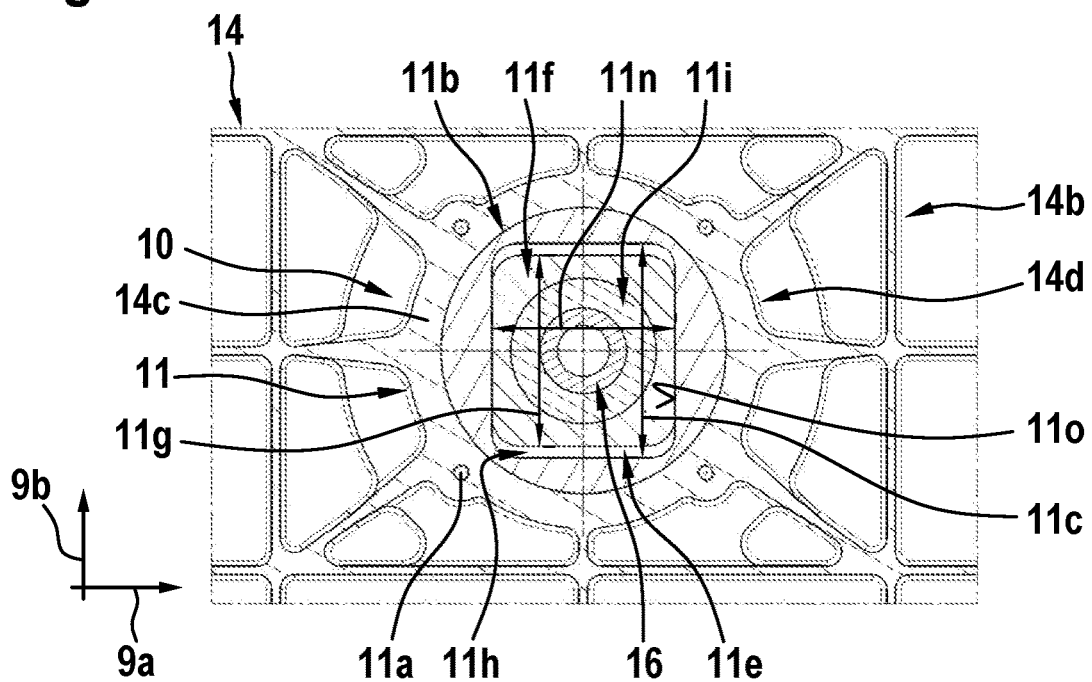
FIG. 6 shows a sectional view of a portion of the at least one non-retractable wheel-type landing gear of FIG. 2, seen from below in vertical direction of the rotorcraft of FIG. 1.

FIG. 6 shows the tube fixation 10 of FIG. 2 to FIG. 5, where the mounting pin 16 of the shock absorber tube 8c is rotatably mounted to the fixation unit 11 at the inner floor 14 that is provided with the stiffening structure 14b and the floor fitting 14d. Similar to FIG. 2 and FIG. 3, the longitudinal direction 9a and the transverse direction 9c are indicated.

Illustratively, the inner floor 14 is provided with a reinforcement ring 14c. The reinforcement ring 14c is integrated into the stiffening structure 14b for forming and reinforcing the floor fitting 14d. The reinforcement ring 14c illustratively comprises radial extensions which form reinforcement ribs that extend from the reinforcement ring 14c outward to properly distribute load introduced by the mounting pin 16 into the inner floor 14.

As described above at FIG. 4 and FIG. 5, the fixation unit 11 is mounted to the floor fitting 14d provided at the inner floor 14. The fixation unit 11 comprises the socket 11b and the spherical bearing 11i that is mounted to the mounting pin 16. The spherical bearing 11i is housed in the sliding block 11f which is mounted to the socket 11b that forms an accommodation 11e for the sliding block 11f.

FIG. 6 further illustrates the lengths 11n of the accommodation 11e and the sliding block 11f in the longitudinal direction 9a, as well as the width 11c of the accommodation 11e in the transverse direction 9c and the width 11g of the sliding block 11f in the transverse direction 9c. Accordingly, FIG. 6 further illustrates the gap formed in the transverse direction 9c between the sliding block 11f and the socket 11b, which determines the predetermined play 11h of the sliding block 11f, i.e., the mounting pin 16 in the transverse direction 9c, as described above at FIG. 4. Similarly, FIG. 6 also further illustrates arrangement of the sliding block 11f in the accommodation 11e, i.e., the socket 11b, free of play in the longitudinal direction 9a, as described above at FIG. 5.

Figure 7:
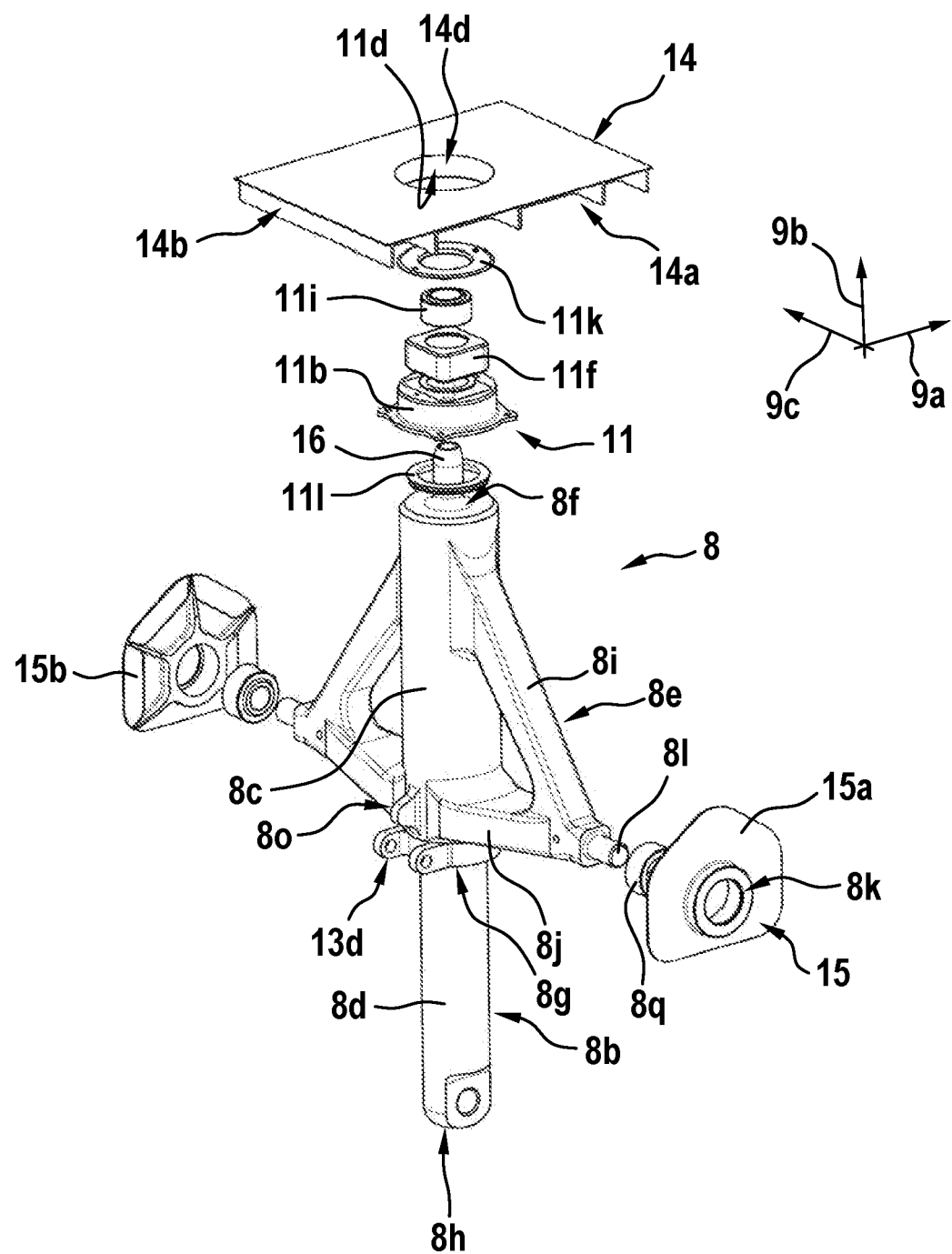
FIG. 7 shows an exploded view of the portion of the at least one non-retractable wheel-type landing gear of FIG. 3.

FIG. 7 shows the nose landing gear 8 with the shock absorber 8b of FIG. 3 together with the inner floor 14 of FIG. 3, but without the tandem wheels 8a and the torque link 13 of FIG. 2, which are again omitted for simplicity and clarity of the drawing. Similar to FIG. 3, the longitudinal direction 9a, the vertical direction 9b, as well as the transverse direction 9c are indicated.

As described above at FIG. 3, the shock absorber 8b comprises the shock absorber tube 8c and the shock absorber rod 8d telescopically mounted to the shock absorber tube 8c. The two mounting arms 8e extend laterally from the shock absorber tube 8c in the transverse direction 9c and comprise the trunnions 8l for provision of trunnion fixations 8k at the two lateral fittings 15a, 15b. Furthermore, the shock absorber 8b and, more specifically, the shock absorber tube 8c is connected via the mounting pin 16 to the fixation unit 11 at the inner floor 14.

FIG. 7 further illustrates the floor fitting 14d, the top cover 11k, the spherical bearing 11i, the sliding block 11f, the socket 11b, and the seal 111, as well as the mounting pin 16 which is integrally formed with the shock absorber tube 8c of FIG. 4 to FIG. 6. In addition, FIG. 7 also illustrates trunnion bearings 8q which are provided for rotatably and slidably receiving the trunnions 8l of the two mounting arms 8e.

Figure 8:
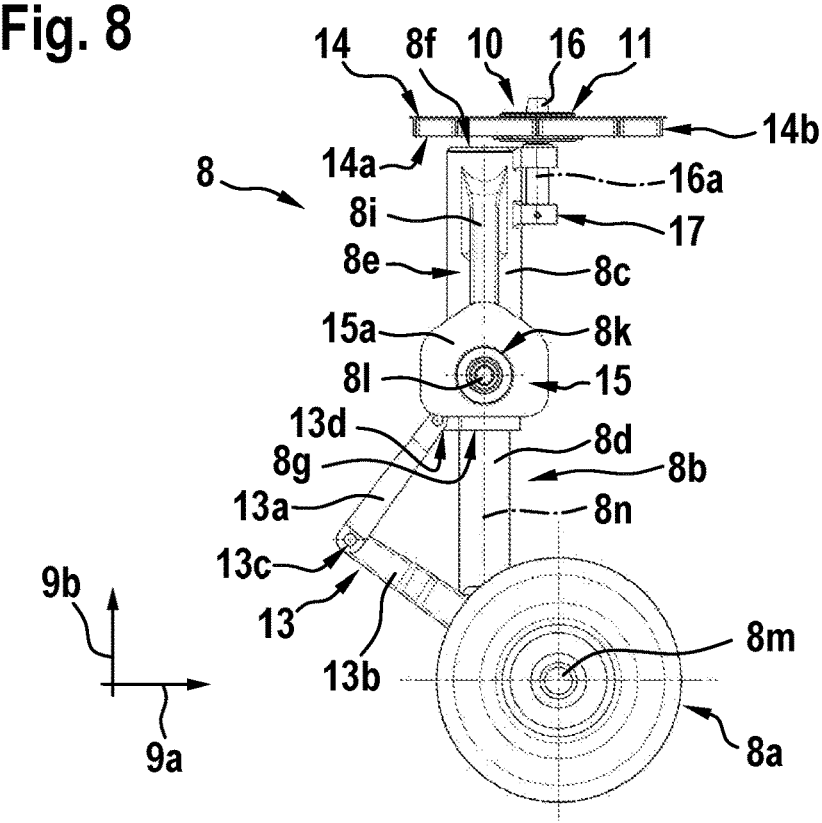
FIG. 8 shows a lateral view of the at least one non-retractable wheel-type landing gear of FIG. 2, according to a variant.

FIG. 8 shows the nose landing gear 8 with the shock absorber 8b of FIG. 2 together with the inner floor 14, the tandem wheels 8a, and the torque link 13 of FIG. 2. Similar to FIG. 2, the longitudinal direction 9a and the vertical direction 9b are indicated.

As described above at FIG. 2 to FIG. 6, the shock absorber 8b which comprises the shock absorber tube 8c and the shock absorber rod 8d is mounted to the inner floor 14 at the tube fixation 10, where the mounting pin 16 is rotatably mounted to the fixation unit 11. However, instead of being integrally formed with the shock absorber tube 8c the mounting pin 16 is now illustratively formed as a separate, preferably exchangeable component that is rigidly mounted to a mounting lug 17 provided, by way of example, in the region of the upper end 8f of the shock absorber tube 8c. The mounting lug 17 illustratively comprises two separate protruding lugs. Preferably, the mounting pin 16 is secured in the mounting lug 17 against axial movement and rotational motion.

Figure 9:
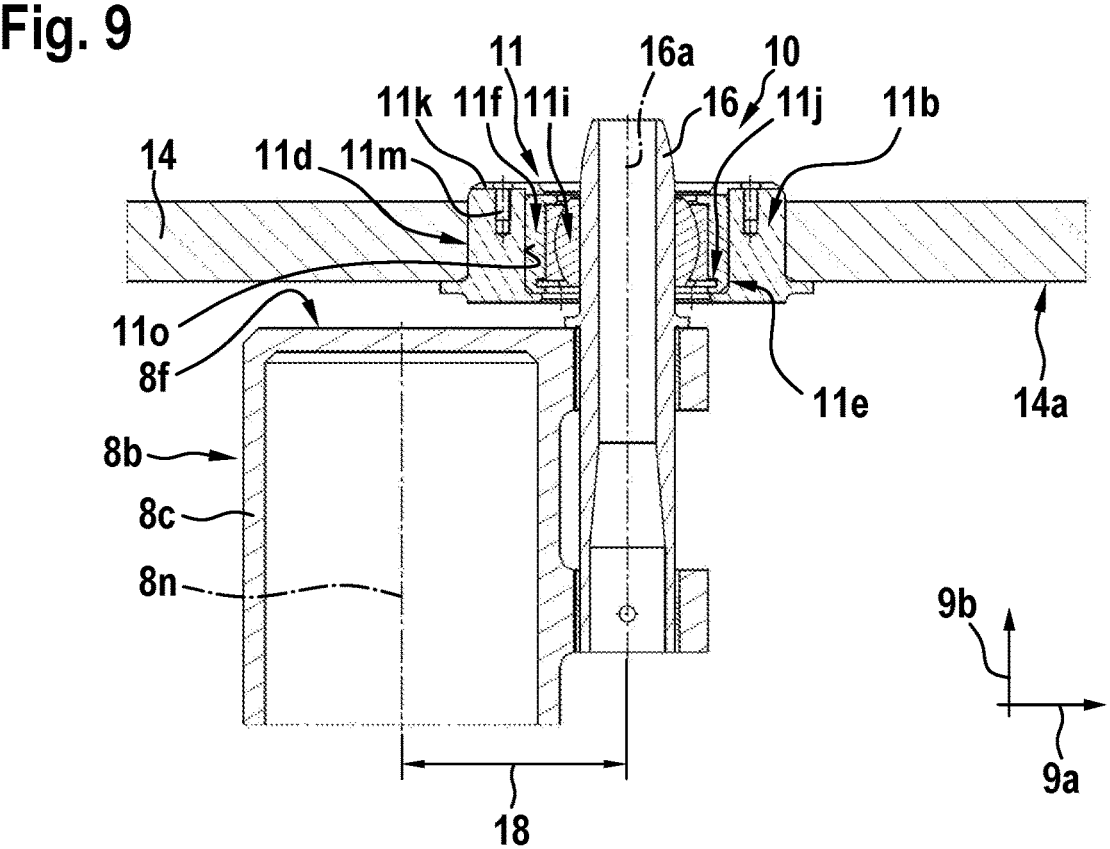
FIG. 9 shows a sectional view of a portion of the at least one non-retractable wheel-type landing gear of FIG. 8, seen in transverse direction of the rotorcraft of FIG. 1.

FIG. 9 shows in analogy to FIG. 4 and FIG. 5 the upper end 8f of the shock absorber tube 8c of the shock absorber 8b of FIG. 8, with the mounting pin 16 that extends in the vertical direction 9b toward the tube fixation 10, where the mounting pin 16 is rotatably mounted to the fixation unit 11 at the inner floor 14. Similar to FIG. 8, the longitudinal direction 9a and the vertical direction 9b are indicated.

However, in contrast to FIG. 4 and FIG. 5, where the length axis 16a of the mounting pin 16 and the length axis 8n of the shock absorber tube 8c are congruent, they are now spaced apart from each other with a predetermined offset 18. Nevertheless, both axes 16a, 8n are preferably still arranged in parallel with respect to each other.

It should be noted that modifications to the above described embodiments are within the common knowledge of the person skilled in the art and, thus, also considered as being part of the present disclosure. For instance, although the at least one non-retractable wheel-type landing gear is only described in the context of a nose landing gear in FIG. 2 to FIG. 9, the configuration and structure thereof may likewise be applied to one or more of the main landing gears 7 of FIG. 1. It should further be noted that in the context of the present description the term "non-retractable wheel-type landing gear" refers to a fixed landing gear which is statically and rigidly mounted to the fuselage of a rotorcraft and which may not be entirely or even partially be retracted into an associated storage compartment during flight operation of the rotorcraft.

REFERENCE LIST 1 rotorcraft
1a multi-blade main rotor
1b, 1c rotor blades
1d rotor head
1e rotor shaft
2 fuselage
2a cabin
2b rear fuselage
2c lower fuselage compartment 2d fuselage lower shell
2e fuselage side shell
2f compartment opening
3 tail boom
4 counter-torque device
4a tail rotor
5 fin
6 wheel-type landing gear
7 non-retractable main landing gear
8 non-retractable nose landing gear
8a tandem wheels
8b shock absorber
8c shock absorber tube
8d shock absorber rod
8e shock absorber mounting arms
8f shock absorber tube upper end
8g shock absorber tube lower end
8h shock absorber rod lower end
8i shock absorber tube upper mounting arm section
8j shock absorber tube lower mounting arm section
8k mounting arm main trunnion fixation
8l mounting arm trunnion
8m wheel axle
8n shock absorber length axis
8o locking pad
8p wheel axle bearing
8q trunnion bearing
9a longitudinal direction
9b vertical direction
9c transverse direction
10 shock absorber tube fixation
11 shock absorber tube fixation unit
11a mounting screws
11b fixation unit socket
11c socket width in transverse direction
11d socket outer bearing surface
11e sliding block accommodation
11f sliding block
11g sliding block width in transverse direction
11h gap in transverse direction resp. lateral play
11i pin bearing
11j securing ring
11k top cover
11l seal
11m cover fixation screws
11n sliding block and sliding block accommodation length in longitudinal direction
11o sliding contact surface
12 mounting bracket hinge
13 torque link
13a torque arm
13b mounting bracket
13c hinged connection
13d torque link fixation
14 inner floor
14a inner floor lower side
14b inner floor stiffening structure
14c reinforcement ring
14d upper floor fitting
15 lateral mounting arm trunnion fittings
15a, 15b lateral mounting arm trunnion fitting
16 shock absorber mounting pin
16a pin length axis
17 shock absorber tube lug
18 axes offset

What is claimed is:
1. A rotorcraft with a fuselage comprising a lower shell, an inner floor, and at least one lower fuselage compartment arranged between the inner floor and the lower shell, wherein the at least one lower fuselage compartment is equipped with a floor fitting provided at the inner floor and at least two lateral fittings, and wherein the at least one lower fuselage compartment is at least accessible via an opening formed in the lower shell, the rotorcraft comprising:
at least one non-retractable wheel-type landing gear rigidly attached in the at least one lower fuselage compartment and extending at least partly through the opening formed in the lower shell, comprising:
at least one wheel;
a shock absorber connected to the at least one wheel, comprising:
a shock absorber tube, and
a shock absorber rod telescopically mounted to the shock absorber tube;
at least two mounting arms extending laterally from the shock absorber tube toward the at least two lateral fittings in the at least one lower fuselage compartment, wherein the at least two mounting arms are mounted to the at least two lateral fittings; and
a mounting pin extending from the shock absorber tube toward the floor fitting provided at the inner floor, wherein the mounting pin is connected to the floor fitting.
2. The rotorcraft of claim 1, further comprising a fixation unit mounted to the floor fitting, wherein the mounting pin is mounted to the fixation unit.
3. The rotorcraft of claim 2,
wherein the mounting pin is mounted with a predetermined play in transverse direction of the fuselage to the fixation unit.
4. The rotorcraft of claim 2,
wherein the mounting pin is mounted free of play in longitudinal direction of the fuselage to the fixation unit.
5. The rotorcraft of claim 2,
wherein the fixation unit comprises a socket that is rigidly attached to the inner floor, preferably by means of screws.
6. The rotorcraft of claim 5,
wherein the fixation unit comprises a spherical bearing mounted to the mounting pin.
7. The rotorcraft of claim 6,
wherein the mounting pin comprises an associated length axis and is slidable within the spherical bearing in direction of the associated length axis.
8. The rotorcraft of claim 6,
wherein the fixation unit comprises a sliding block housing the spherical bearing.
9. The rotorcraft of claim 8,
wherein the sliding block is mounted to the socket with a predetermined play in transverse direction of the fuselage and/or free of play in longitudinal direction of the fuselage.
10. The rotorcraft of claim 2,
wherein the fixation unit comprises a cover that covers the fixation unit on a side pointing away from the shock absorber.
11. The rotorcraft of claim 1, further comprising a seal arranged between the floor fitting and an axial end of the shock absorber tube.
12. The rotorcraft of claim 1,
wherein the mounting pin is integrally formed with the shock absorber tube.

13. The rotorcraft of claim 1,
wherein the shock absorber tube comprises a mounting lug, and wherein the mounting pin is rigidly mounted to the mounting lug.

14. The rotorcraft of claim 12,
wherein the shock absorber tube comprises a first length axis, wherein the mounting pin comprises a second length axis, and wherein the first and second length axes are congruent.

15. The rotorcraft of claim 12,
wherein the shock absorber tube comprises a first length axis, wherein the mounting pin comprises a second length axis, and wherein the first and second length axes are arranged in parallel.

* * * * *